Sept. 11, 1951     W. S. McLEISH     2,567,521
CONDUIT SYSTEM
Filed Dec. 30, 1944
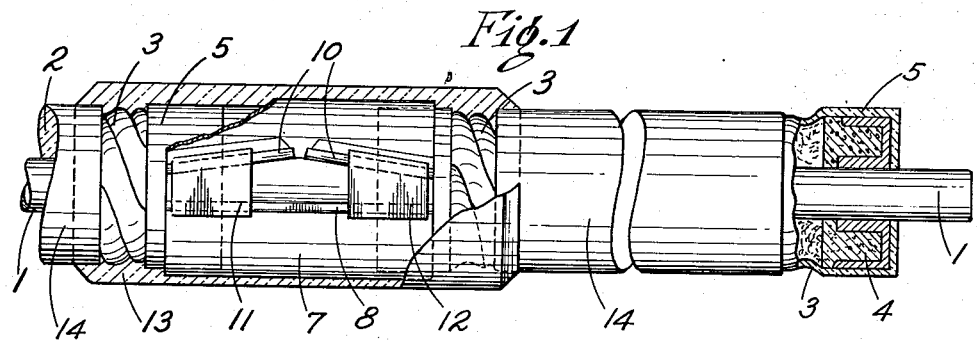
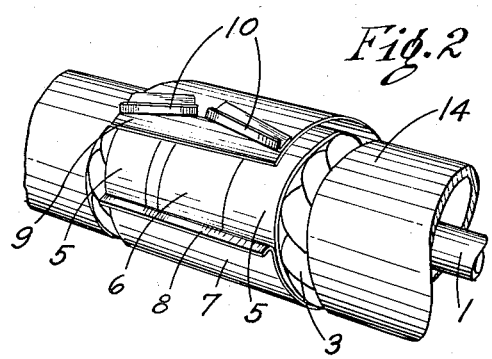
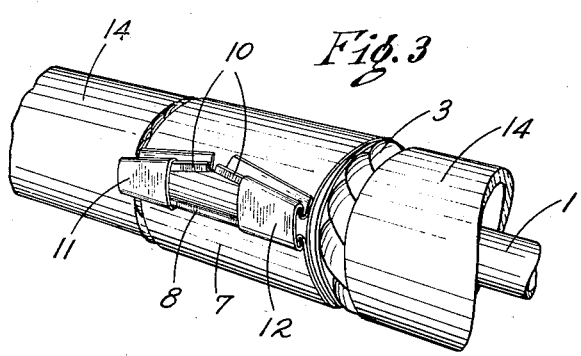
INVENTOR.
William S. McLeish
BY
Hawgood and Van Horn
ATTORNEYS Patented Sept. 11, 1951

2,567,521

UNITED STATES PATENT OFFICE 2,567,521

CONDUIT SYSTEM

William S. McLeish, Barberton, Ohio, assignor to The Ric-wil Company, Cleveland, Ohio, a corporation of Ohio Application December 30, 1944, Serial No. 570,672

1 Claim. (Cl. 285—193)

This invention relates to conduits and is particularly useful with conduits for carrying fluids at high or low temperatures.

An object of the invention is to provide an improved means for connecting the ends of conduit sections which will effectively hold such sections in proper alinement.

Another object is to provide an improved means of connecting the ends of conduit sections which may be easily applied.

Another object of the invention is to provide an improved means for connecting the ends of conduit sections which may be applied without the use of special tools.

Another object of the invention is to provide an improved means for connecting the ends of conduit sections which may be easily manufactured.

Another object of the invention is to provide an improved means for connecting ends of conduit sections which may be rendered waterproof.

Other objects will hereinafter appear.

The invention will be better understood from the description of one practical embodiment thereof, illustrated in the accompanying drawings, in which;

Figure 1 is a fragmentary elevational view, parts being broken away and shown in section, of two adjacent conduit sections secured together by connecting means embodying the invention;

Figure 2 is a perspective view of the joint of Figure 1, showing the parts in partially assembled relation; and Figure 3 is a view similar to Figure 2, showing the parts entirely assembled, excepting for the application of the waterproofing covering.

The connecting means here illustrated may be used in many relations, one type of construction in which it is found to be particularly advantageous being in unit type heat-insulating conduits such as disclosed in the patent to Gottwald, No. 1,991,445 and it is in conjunction with such units that it is illustrated.

These units each consist of a central fluid conductor pipe 1, surrounded by heat-insulating material 2, which, in turn, is enclosed within a corrugated metallic shell 3. The pipe, while in shell 3, is held in properly spaced relation thereto, as by blocks 4 inserted in the ends of the latter, and through which the ends of the former project, these blocks being most conveniently made of solid heat-insulating material.

The ends of the shells 3, particularly if the corrugations in these shells are helical, may conveniently be expanded into cylindrical form, as indicated at 5, as more fully set forth in the application of Gottwald, Serial No. 388,479, filed April 14, 1941, now abandoned.

In assembling such units, the ends of the pipes 1 of adjacent units are brought together, connected and sealed, as by welding, the projection of these ends beyond the blocks 4 being sufficient to afford room for the convenient performance of this joining operation.

After these tubing ends have been connected, the space about them is filled with heat insulating material shown as segmental blocks 6. These blocks 6 and also ends 5 of the shells are enclosed in a metal cover 7 placed over them, as indicated in Figure 2.

This cover consists of a generally cylindrical piece of sheet metal 7 formed at one end into an axially extending flange 8 and having adjacent its end 9 remote therefrom two inclined or helically disposed flanges 10 which are also made of sheet metal and conveniently are secured to the exterior of sheet 7 by welding.

It will be noted that the inclined flanges 10 are spaced far enough from the edge 9 to permit this edge to extend under the edge and flange 8 when the connector or coupling is pressed manually about the ends 5 of the adjacent sections.

With the parts first assembled in Figure 2 and then pressed together, tapered (or channel-shaped) clamps 11 and 12 are slid over both the flanges 8 and 10, and as these are moved toward the center of the coupling, this motion acting to wedge these flanges toward each other.

In order to tighten the coupling as much as desired, it is only necessary to apply lengthwise force to clamps 11 and 12, as by pounding them on their outer ends with a hammer, and the great mechanical advantage of the wedging action of the clamps contracts and pulls the coupling 7 tightly upon the exterior of the cylindrical ends 5.

It will also be noted that, due to the fact that two separate clamps are used for opposite ends of the coupling and that these may be moved independently of each other, one end may be reduced to a smaller diameter than the other sufficiently to take care of any fluctuations or variations in size or shape of the external surfaces of ends 5 of the two sections which are being joined.

After the parts have been assembled, as indicated in Figure 3, a covering 13 of asphalt or asphalt and felt or any other suitable or desired waterproofing material may be molded, wound or otherwise formed about the coupling, this making a water-tight connection with the asphalt coverings 14 of the conduit unit sections.

As an alternative manner of sealing the coupling, the exterior of the ends 5 of the casing and the interior of metal cover 7 may be coated with fluid or plastic sealing material, such as asphalt cut with vaporizable hydro-carbon, such as gasoline, which, when the coupling is tightly clamped upon the casing ends, forms an effective water-tight seal and may be used in any installations without need for the asphalt covering 13.

While I have described the illustrated embodiments of my invention in some particularity, obviously many others will readily occur to those skilled in this art, and I do not, therefore, limit myself to the precise details shown and described herein, but claim as my invention all embodiments, modifications and variations coming within the scope of the appended claim.

I claim:

In a conduit system including a plurality of tubular casing sections arranged in axial alignment, a coupling surrounding the adjacent ends of two successive sections consisting of a flexible band wound spirally into tubular form about said ends, the edges of the band overlapping, clamping means on opposite sides of the overlap fixed to the band adjacent one end thereof and clamping said end about the end of the one of the successive sections, clamping means fixed to the band on opposite sides of the overlap adjacent the other end thereof and clamping said end upon the end of the other successive section independently of the first mentioned clamping means.

WILLIAM S. McLEISH.

REFERENCES CITED

The following references are of record in the file of this patent:

UNITED STATES PATENTS

| Number | Name | Date |
|---|---|---|
| 180,781 | Morgan | Aug. 8, 1876 |
| 224,397 | Crook | Feb. 10, 1880 |
| 1,225,867 | Schumacher | May 15, 1917 |
| 1,474,822 | Hauf | Nov. 20, 1923 |
| 1,898,623 | Gammeter | Feb. 21, 1933 |
| 1,931,024 | Howard | Oct. 17, 1933 |
| 2,403,839 | Adalph | July 9, 1946 |